United States Patent
Yin et al.

(10) Patent No.: US 11,791,660 B2
(45) Date of Patent: Oct. 17, 2023

(54) OUTPUT CONTROL DEVICE FOR CONTROLLING AN OPERATION MODE OF A COIL

(71) Applicants: Guangdong Midea White Home Appliance Technology Innovation Center Co., Ltd., Foshan (CN); Midea Group Co., Ltd., Foshan (CN)

(72) Inventors: Kunren Yin, Foshan (CN); Hui Liao, Foshan (CN)

(73) Assignees: GUANGDONG MIDEA WHITE HOME APPLIANCE TECHNOLOGY INNOVATION CENTER CO., INC., Foshan (CN); MIDEA GROUP CO., LTD., Foshan (CN)

( * ) Notice: Subject to any disclaimer, the term of this patent is extended or adjusted under 35 U.S.C. 154(b) by 44 days.

(21) Appl. No.: 17/674,208

(22) Filed: Feb. 17, 2022

(65) Prior Publication Data

US 2022/0173621 A1 Jun. 2, 2022

Related U.S. Application Data

(63) Continuation of application No. PCT/CN2019/122810, filed on Dec. 3, 2019.

(30) Foreign Application Priority Data

Aug. 19, 2019 (CN) .......................... 201910765738.X

(51) Int. Cl.
*H02J 50/00* (2016.01)
*H02J 50/12* (2016.01)
(Continued)

(52) U.S. Cl.
CPC ............ *H02J 50/12* (2016.02); *H04B 5/0037* (2013.01); *H04B 5/0081* (2013.01); *H05B 6/06* (2013.01); *H05B 6/36* (2013.01)

(58) Field of Classification Search
CPC .................................. H05B 6/00; H05B 6/02
See application file for complete search history.

(56) References Cited

U.S. PATENT DOCUMENTS

| | | | |
|---|---|---|---|
| 3,710,062 A | 1/1973 | Peters, Jr. | |
| 4,792,965 A * | 12/1988 | Morgan | H04B 5/00 340/870.31 |

(Continued)

FOREIGN PATENT DOCUMENTS

| | | |
|---|---|---|
| CN | 102257878 B | 11/2013 |
| CN | 103744492 A | 4/2014 |

(Continued)

OTHER PUBLICATIONS

Midea Group Co., Ltd., 1st CN Office Action, CN Patent Application No. 201910765738.X, dated Jul. 5, 2022, 15 pgs.

(Continued)

*Primary Examiner* — Adi Amrany
(74) *Attorney, Agent, or Firm* — Morgan, Lewis & Bockius LLP

(57) ABSTRACT

An output control device includes an output component, a first switch and a second switch. The output component includes a first output coil used for controlling, when the first circuit is turned on and the second circuit is not turned on, the first output coil to enter a heating working state, and controlling, when the first circuit is not turned on and the second circuit is turned on, the first output coil to enter a power transmission working state. The first switch is located in the first circuit and used for turning on the first circuit when being closed. The second switch is located in the (Continued)

second circuit and used for turning on the second circuit when being closed.

12 Claims, 4 Drawing Sheets

(51) Int. Cl.
  *H04B 5/00* (2006.01)
  *H05B 6/06* (2006.01)
  *H05B 6/36* (2006.01)

(56) References Cited

U.S. PATENT DOCUMENTS

| | | | |
|---|---|---|---|
| 2011/0242868 A1* | 10/2011 | Gray | H05B 6/06 363/131 |
| 2015/0270719 A1 | 9/2015 | Kurs et al. | |
| 2018/0192479 A1* | 7/2018 | Kwack | H05B 6/062 |
| 2018/0351369 A1* | 12/2018 | Lee | H02J 50/80 |
| 2019/0104571 A1 | 4/2019 | Clark et al. | |
| 2019/0124726 A1 | 4/2019 | Moon et al. | |
| 2019/0124727 A1* | 4/2019 | Moon | H05B 6/062 |
| 2019/0357317 A1* | 11/2019 | Kwack | H05B 6/06 |
| 2020/0244174 A1* | 7/2020 | Kanakasabai | H02M 3/33573 |
| 2020/0337120 A1* | 10/2020 | Oh | H05B 6/04 |
| 2021/0127461 A1* | 4/2021 | Kwack | H05B 6/062 |
| 2021/0257866 A1* | 8/2021 | Lee | H02J 50/12 |

FOREIGN PATENT DOCUMENTS

| | | | | |
|---|---|---|---|---|
| CN | 104113143 A | 10/2014 | | |
| CN | 106162963 A | 11/2016 | | |
| CN | 106685102 A | 5/2017 | | |
| CN | 206176478 U | 5/2017 | | |
| CN | 109567276 A | 4/2019 | | |
| EP | 3346799 A1 * | 7/2018 | | F24C 15/106 |
| JP | 2012080742 A | 4/2012 | | |
| JP | 2016134355 A | 7/2016 | | |
| JP | 2017046510 A | 3/2017 | | |
| KR | 101727744 B1 | 4/2017 | | |
| WO | WO 2017022516 A1 | 2/2017 | | |
| WO | WO 2017054228 A1 | 4/2017 | | |

OTHER PUBLICATIONS

Midea Group Co., Ltd., WO, PCT/CN2019/122810, dated May 19, 2020, 7 pgs.
Midea Group Co., Ltd., IPRP, PCT/CN2019/122810, dated Feb. 17, 2022, 5 pgs.
International Search Report and Written Opinion, PCT/CN2019/122810, dated May 19, 2020, 9 pgs.
Midea Group Co., Ltd., Chinese Office Action, CN Patent Application No. 201910765738.X, dated May 8, 2023, 11 pgs.
Midea Group Co., Ltd., Extended European Search Report and Supplementary Search Report, EP19942614.9, dated Feb. 16, 2023, 9 pgs.
Midea Group Co., Ltd., Japanese Office Action, JP Patent Application No. 2022-511093, dated Mar. 28, 2023, 10 pgs.

* cited by examiner ated devices and wireless power transmission devices are constantly emerging, which has brought great convenience to people's life. However, due to the different working properties of heating technology and wireless power transmission technology, at present, electric heating devices used to heat objects can only be used for heating but cannot carry out wireless power transmission, such as induction cookers and other heating devices. Moreover, high-power transmission device can only be used for wireless power transmission but cannot be used for heating objects, such as automobile wireless charging devices. Therefore, when using the heating function and the wireless charging function, the user may need to select a device with corresponding function, so that the utilization rate, intelligence and user experience of the device are low. Therefore, how to combine the heating function with the wireless power transmission function so as to improve the utilization rate of the device is an urgent problem to be solved.

OUTPUT CONTROL DEVICE FOR CONTROLLING AN OPERATION MODE OF A COIL

CROSS-REFERENCE TO RELATED APPLICATION

This application is a continuation of PCT International Application No. PCT/CN2019/122810, filed Dec. 3, 2019, which claims the benefit of the Chinese Patent Application No. 201910765738.X, filed on Aug. 19, 2019, with China National Intellectual Property Administration, the entire contents of which are incorporated herein by reference.

TECHNICAL FIELD

The present disclosure relates to the technical field of electronic control, in particular to output control device and method, and a storage medium.

BACKGROUND

With the increasing popularity of electric heating technology and the rapid development of wireless charging technology, a variety of heating devices and wireless power transmission devices are constantly emerging, which has brought great convenience to people's life. However, due to the different working properties of heating technology and wireless power transmission technology, at present, electric heating devices used to heat objects can only be used for heating but cannot carry out wireless power transmission, such as induction cookers and other heating devices. Moreover, high-power transmission device can only be used for wireless power transmission but cannot be used for heating objects, such as automobile wireless charging devices. Therefore, when using the heating function and the wireless charging function, the user may need to select a device with corresponding function, so that the utilization rate, intelligence and user experience of the device are low. Therefore, how to combine the heating function with the wireless power transmission function so as to improve the utilization rate of the device is an urgent problem to be solved.

SUMMARY

In order to solve the above technical problems, it is desirable for the embodiments of the present disclosure to provide an output control device, an output control method and a computer storage medium.

The technical solution of the disclosure is realized as follows.

According to a first aspect, there is provided an output control device including: an output component, a first switch and a second switch.

The output component includes a first output wire coil, and is configured to control the first output wire coil to enter a heating working state when a first circuit is turned on and a second circuit is not turned on; and to control the first output wire coil to enter a power transmission working state when the first circuit is not turned on and the second circuit is turned on.

The first switch is located in the first circuit and is configured to turn on the first circuit when being closed.

The second switch is located in the second circuit and is configured to turn on the second circuit when being closed.

According to a second aspect, there is provided an output control method including the following operations.

When a first circuit is turned on and a second circuit is not turned on, a first output wire coil of an output component enters a heating working state.

When the first circuit is not turned on and the second circuit is turned on, the first output wire coil of the output component enters a power transmission working state.

The first circuit is provided with a first switch and is turned on when the first switch is closed. The second circuit is provided with a second switch and is turned on when the second switch is closed.

According to a third aspect, there is provided a computer-readable storage medium. The computer-readable storage medium stores one or more programs executable by one or more processors to implement the steps of the output control method according to the second aspect.

The output control device, the output control method and the computer storage medium provided in the embodiments of the present disclosure may include an output component, a first switch and a second switch. The output component includes a first output wire coil, and is configured to control the first output wire coil to enter a heating working state when a first circuit is turned on and a second circuit is not turned on; and to control the first output wire coil to enter a power transmission working state when the first circuit is not turned on and the second circuit is turned on. The first switch is located in the first circuit and is configured to turn on the first circuit when being closed; and the second switch is located in the second circuit and is configured to turn on the second circuit when being closed. In this way, the heating function and the power transmission function are integrated in the same device through the output component, the first switch and the second switch, and the switching between the heating working state and the power transmission working state is realized through the closed or open state of the first switch and the second switch. As such, the utilization rate and intelligent degree of the device are improved, and the users' experience is enhanced.

DETAILED DESCRIPTION

The technical solution in the embodiments of the disclosure will be clearly and completely described below with reference to the drawings in the embodiments of the disclosure.

Figure 1:
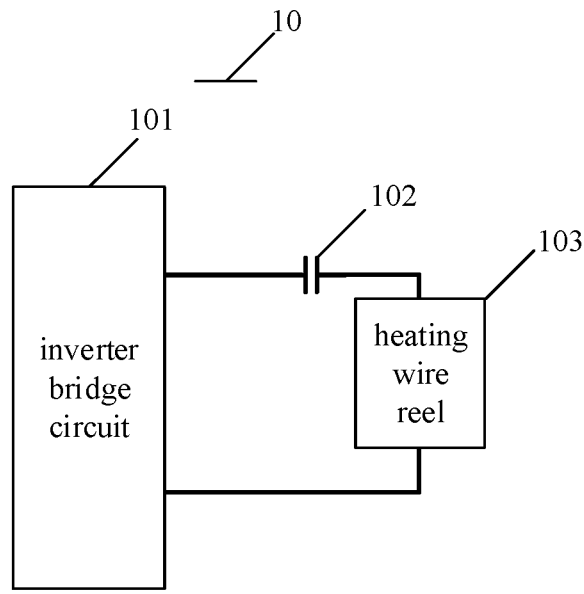
FIG. 1 is a schematic view of a circuit topology of a heating device provided by some embodiments of the present disclosure.

In practical use, the circuit topology of the heating device may be shown in FIG. 1, the heating device 10 specifically includes an inverter bridge circuit 101, a capacitor 102 and a heating wire reel 103. The capacitor may be a compensation capacitor. The heating device makes the heating wire reel generate an alternating magnetic field with a constantly changing direction through the inverter bridge circuit, and eddy current will appear inside a conductor located in the alternating magnetic field, the conductor is warmed up through the Joule heating effect of the eddy current, thereby realizing the heating.

Figure 2:
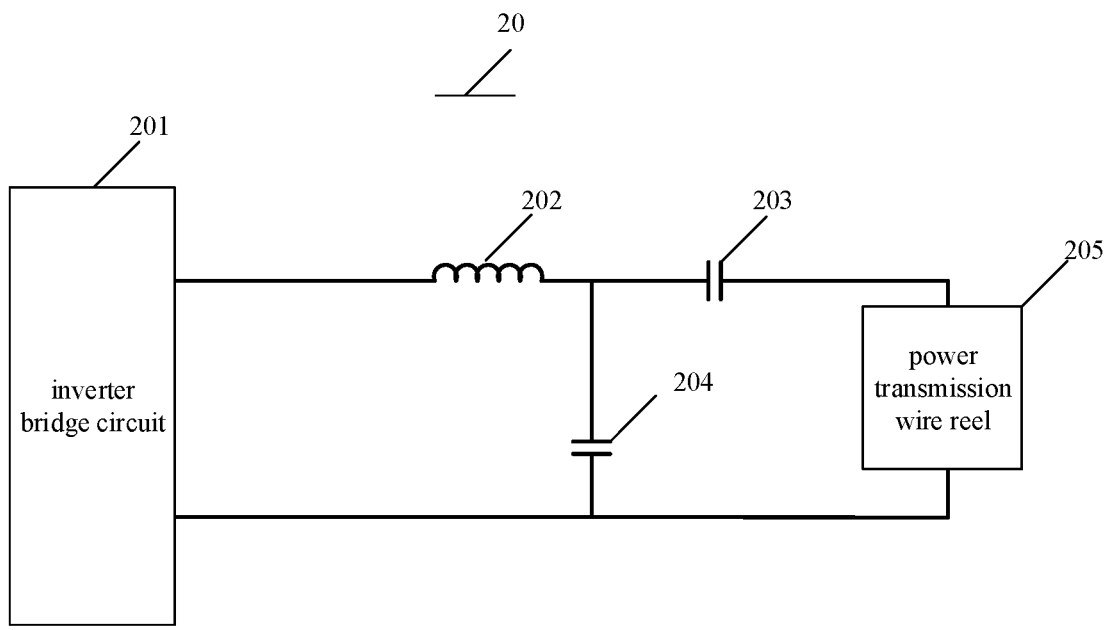
FIG. 2 is a schematic view of a circuit topology of a wireless power transmission device provided by some embodiments of the present disclosure.

In addition, the circuit topology of the wireless power transmission device in the prior art is shown in FIG. 2. The wireless power transmission device 20 specifically includes an inverter bridge circuit 201, an inductor 202, a resonant capacitor 203, a capacitor 204, and a power transmission wire reel 205. The inductor 202 may be a compensation/filter/bandpass inductor, and the capacitor 204 may be a compensation/oscillation capacitor. Herein, the wireless power transmission device is connected by the circuit shown in FIG. 2, such that the power transmission wire reel generates an induced magnetic flux to transmit power.

As can be seen from the schematic view of the circuit topology in FIG. 1 and FIG. 2, the working property of the heating device is different from the working property of the power transmission device. At present, the heating device and the power transmission device are both single entities, the heating device cannot realize the power transmission function, and the power transmission device cannot heat objects. Therefore, when using the heating function and the wireless charging function, the user may need to select the device with corresponding function, and thus the utilization rate, intelligence and user experience of the device are low.

Figure 3:
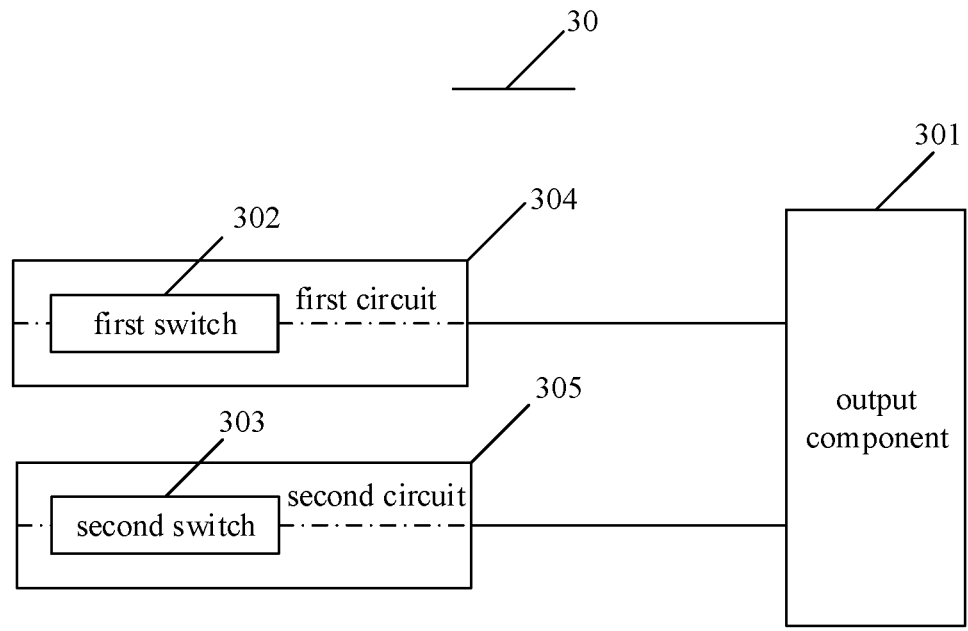
FIG. 3 is a schematic structural view of an output control device provided by some embodiments of the present disclosure.

Based on the above problems, some embodiments of the present disclosure provide an output control device. Referring to FIG. 3, the output control device 30 includes: an output component 301, a first switch 302 and a second switch 303.

The output component 301 includes a first output wire coil, and the output component is configured to control the first output wire coil to enter a heating working state when a first circuit is turned on and a second circuit is not turned on; and to control the first output wire coil to enter a power transmission working state when the first circuit is not turned on and the second circuit is turned on.

The first switch 302 is located in the first circuit and is configured to turn on the first circuit when being closed.

The second switch 302 is located in the second circuit and is configured to turn on the second circuit when being closed.

In other embodiments of the disclosure, the output control device further includes a first circuit 304, a second circuit 305 and an inverter circuit 306. Specifically, the output component 301 is connected to a first end of the first circuit 304 and a first end of the second circuit 305, respectively. A second end of the first circuit 304 and a second end of the second circuit 305 are connected to the inverter circuit 306. Here, the inverter circuit 306 may provide alternating current to the output component via the first circuit or the second circuit. In some embodiments, the inverter circuit 306 is preferably an inverter bridge circuit.

In other embodiments of the present disclosure, the first switch 302 and the second switch 303 may be circuit switches having both closed and open states. When the first switch is closed and the second switch is opened, the first circuit is turned on and the second circuit is not turned on. At this time, the inverter circuit 306 is connected to the output component via the first circuit, and the output component controls the first output wire coil to be in the heating working state through the connection of the first circuit. When the first switch is opened and the second switch is closed, the first circuit is not turned on and the second circuit is turned on. At this time, the inverter circuit 306 is connected to the output component via the second circuit, and the output component controls the first output wire coil to be in the power transmission working state through the connection of the second circuit.

Further, the output component includes a first output wire coil, which may be an operation wire reel constituted by at least one wire coil. Under the condition that the first circuit is turned on and the second circuit is not turned on, the operation wire reel may generate an alternating magnetic field with a constantly changing direction, and the conductor is warmed up through the Joule heating effect, thereby realizing the heating function. In addition, under the condition that the first circuit is not turned on and the second circuit is turned on, the above operation wire reel can generate an induced magnetic flux for power transmission.

Figure 4:
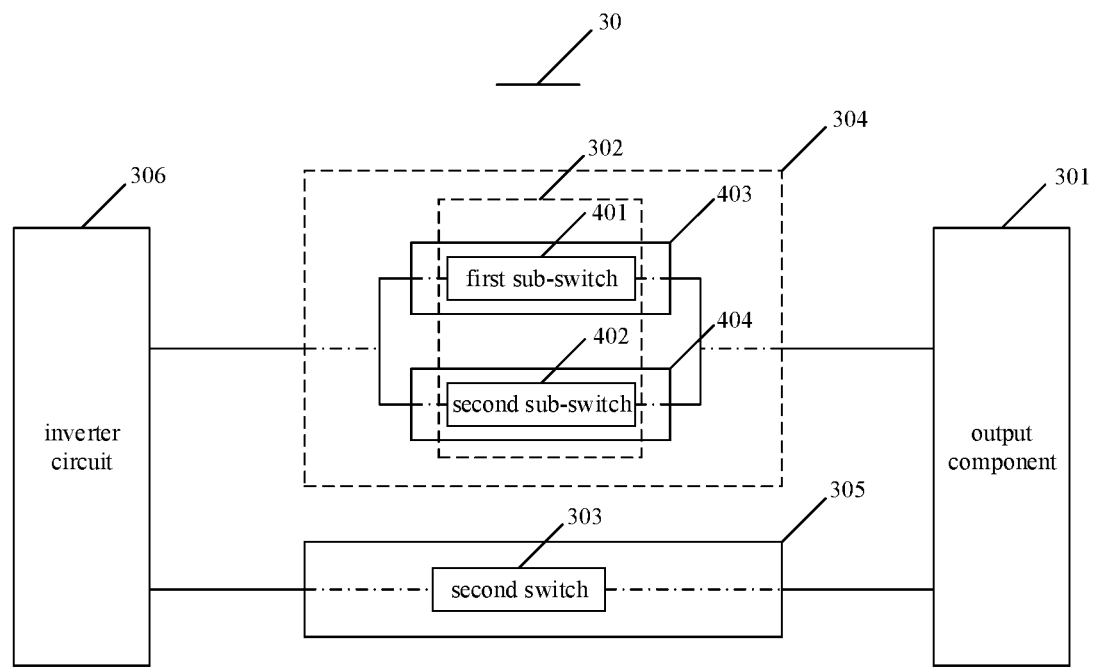
FIG. 4 is a schematic structural view of another output control device provided by some embodiments of the present disclosure.

Based on the foregoing embodiments, in other embodiments of the present disclosure, as shown in FIG. 4, the first switch 302 further includes a first sub-switch 401 and a second sub-switch 402.

Specifically, the first sub-switch 401 is located in a first sub-circuit 403 and is configured to turn on the first sub-circuit when being closed; and the second sub-switch 402 is located in a second sub-circuit 404 and is configured to turn on the second sub-circuit when being closed. The first sub-circuit and/or the second sub-circuit may constitute the first circuit 304.

In other embodiments of the disclosure, the output control device further includes an inverter circuit 306. Specifically, the output component 301 is connected to the first end of the first circuit 304 and the first end of the second circuit 305, respectively. The second end of the first circuit 304 and the second end of the second circuit 305 are connected to the inverter circuit 306. Here, the inverter circuit 306 may provide an alternating current to the output component via the first circuit or the second circuit. In some embodiments, the inverter circuit 306 is preferably an inverter bridge circuit.

Here, the first sub-switch and the second sub-switch each may be a circuit switch, and the first sub-circuit and the second sub-circuit can be connected in parallel. When the first sub-circuit is turned on and the second sub-circuit is not turned on, the first circuit is constituted by the first sub-circuit. When the first sub-circuit is not turned on and the second sub-circuit is turned on, the first circuit is constituted by the second sub-circuit. When the first sub-circuit and the second sub-circuit are simultaneously turned on, the first circuit is constituted by the first sub-circuit and the second sub-circuit.

In other embodiments of the present disclosure, when the first sub-circuit is turned on and the second sub-circuit is not turned on, the first output wire coil is controlled to enter a first heating working state in which a first output power interval is adopted for heating.

When the second sub-circuit is turned on and the first sub-circuit is not turned on, the first output wire coil is controlled to enter a second heating working state in which a second output power interval is adopted for heating.

When the first sub-circuit is turned on and the second sub-circuit is turned on, the first output wire coil is controlled to enter a third heating working state in which a third output power interval is adopted for heating.

Specifically, the first sub-circuit is constituted by the first sub-switch and the first sub-capacitor, and the second sub-circuit is constituted by the second sub-switch and the second sub-capacitor. The capacitance of the first sub-capacitor and the capacitance of the second sub-capacitor are different. The powers of the first output power interval, the second output power interval and the third power interval are different. Exemplarily, the first output power interval may be 1 kW-3 kW, the second output power interval may be 100 W-1 kW, and the third output power interval may be 1.5 kW-3.3 kW.

In this way, under the condition that the first sub-circuit is turned on, the second sub-circuit is not turned on and the second circuit is not turned on (that is, the first sub-switch is closed, the second sub-switch is not closed and the second switch is not closed), the first sub-capacitor in the first sub-circuit is in an working state, and the alternating current output by the inverter circuit 306 acts on the first output wire coil in the output component 301 via the first sub-capacitor, such that the first output wire coil heats the target object in the first output power interval.

In addition, under the condition that the first sub-circuit is not turned on, the second sub-circuit is turned on and the second circuit is not turned on (that is, the first sub-switch is not closed, the second sub-switch is closed and the second switch is not closed), the second sub-capacitor in the second sub-circuit is in an working state, and the alternating current output by the inverter circuit 306 acts on the first output wire coil in the output component 301 via the second sub-capacitor, such that the first output wire coil heats the target object in the second output power interval.

Further, under the condition that both the first sub-circuit and the second sub-circuit are turned on, and the second circuit is not turned on (that is, both the first sub-switch and the second sub-switch are closed, and the second switch is not closed), the alternating current output by the inverter circuit 306 is acted on the first output wire coil in the output component 301 via the first sub-capacitor and the second sub-capacitor in parallel, such that the first output wire coil heats the target object in the third output power interval.

Finally, under the condition that neither the first sub-circuit nor the second sub-circuit is turned on, and the second circuit is turned on (that is, neither the first sub-switch nor the second sub-switch is closed, and the second switch is closed), the alternating current output by the inverter circuit 306 acts on the first output wire coil in the output component 301 via the second circuit, such that the first output wire coil enters the power transmission working state for transmitting power to the target object.

The output control device provided by the embodiments of the present disclosure integrates the heating function and the power transmission function in the same device via the output component, the first switch and the second switch. The heating function and the power transmission function share the same first output wire coil, and the switching between the heating working state and the power transmission working state is realized through the closed or open state of the first switch and the second switch. As such, the utilization rate and the intelligent degree of the device are improved, and the users' experience is enhanced.

Figure 5:
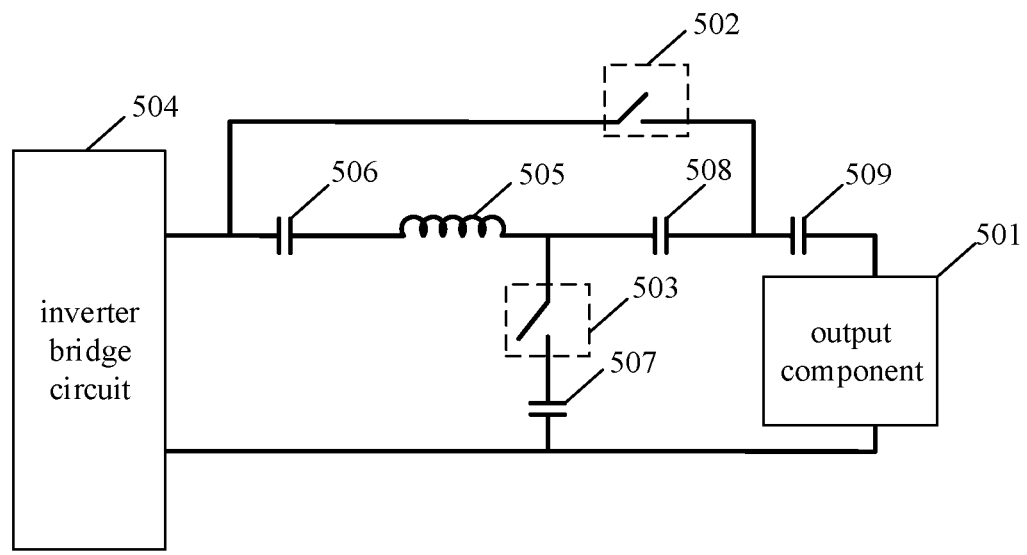
FIG. 5 is a schematic view of a circuit topology of an output control device provided by some embodiments of the present disclosure.

Based on the foregoing embodiments, some embodiments of the present disclosure provide an output control device. Referring to FIG. 5, the device includes: an output component 501, a first switch 502 and a second switch 503.

The output component 501 includes a first output wire coil, and is configured to control the first output wire coil to enter a heating working state when a first circuit is turned on and a second circuit is not turned on, and to control the first output wire coil to enter a power transmission working state when the first circuit is not turned on and the second circuit is turned on.

The first switch 502 is located in the first circuit and is configured to turn on the first circuit when being closed.

The second switch 503 is located in the second circuit and is configured to turn on the second circuit when being closed.

The output control device further includes an inverter bridge circuit 504, to supply an alternating current to the first output wire coil in the output component 501.

In other embodiments of the present disclosure, the output control device further includes: a first inductor 505 and/or a first capacitor 506. The first inductor 505 and/or the first capacitor 506 are arranged in the second circuit. The first inductor may be a compensation/filter/bandpass inductor. In addition, the output control device further includes: a second capacitor 507, a third capacitor 508 and a fourth capacitor 509. The second capacitor 507 and the third capacitor 508 are arranged in the second circuit. The fourth capacitor 509 is a capacitor shared by the first circuit and the second circuit and is arranged in the first circuit and the second circuit.

The connection of individual components is described in detail below.

Specifically, when the output control device includes the first inductor 505 or the first capacitor 506, a first end of the inverter bridge circuit 504 is connected to a first end of the first inductor 505/the first capacitor 506 and a first end of the first switch 502, respectively; and a second end of the first inductor 505/the first capacitor 506 is connected to a first end of the second switch 503 and a first end of the third capacitor 508, respectively. A second end of the second switch 503 is connected to a first end of the second capacitor 507, and a second end of the second capacitor 507 is connected to a second end of the inverter bridge circuit 504 and a second end of the output component 501. Further, a second end of the third capacitor 508 is connected to a second end of the first switch 502 and a first end of the fourth capacitor 509, respectively. In addition, a second end of the fourth capacitor 509 is connected to a first end of the output component 501.

Moreover, when the output control device includes the first inductor 505 and the first capacitor 506, the first inductor 505 and the first capacitor 506 are connected in series. Specifically, as shown in FIG. 5, the first end of the inverter bridge circuit 504 is connected to the first end of the first capacitor 506 and the first end of the first switch 502, respectively; the second end of the first capacitor 506 is connected to the first end of the first inductor 505; the second end of the first inductor 505 is connected to the first end of the second switch 503 and the first end of the third capacitor 508, respectively; the second end of the second switch 503 is connected to the first end of the second capacitor 507, and the second end of the second capacitor 507 is connected to the second end of the inverter bridge circuit 504 and the second end of the output component 501. Further, the second end of the third capacitor is connected to the second end of the first switch 502 and the first end of the fourth capacitor 509, respectively. In addition, the second end of the fourth capacitor 509 is connected to the first end of the output component 501.

As can be seen from FIG. 5, when the first switch 502 is closed and the second switch 503 is not closed, the circuit topology is similar to that shown in FIG. 1. Therefore, when the first switch 502 is closed and the second switch 503 is not closed, the first output wire coil in the output component is in the heating working state. In addition, when the first switch 502 is not closed and the second switch 503 is closed, the circuit topology is similar to the topology structure shown in FIG. 2. Therefore, when the first switch 502 is not closed and the second switch 503 is closed, the first output wire coil in the output component is in the power transmission working state.

Figure 6:
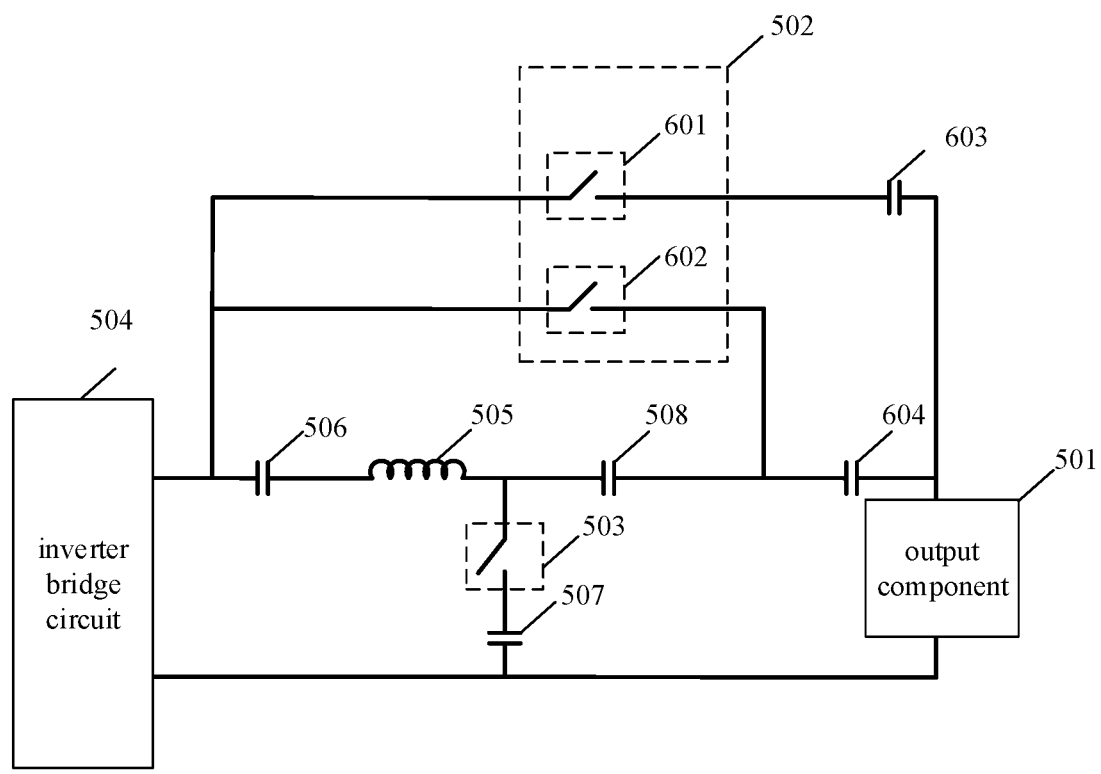
FIG. 6 is a schematic view of a circuit topology of another output control device provided by some embodiments of the present disclosure.

Based on the foregoing embodiments, in other embodiments of the present disclosure, as shown in FIG. 6, the first switch 502 further includes a first sub-switch 601 and a second sub-switch 602. The first sub-switch 601 is located in a first sub-circuit and is configured to turn on the first sub-circuit when being closed. The second sub-switch 602 is located in a second sub-circuit and is configured to turn on the second sub-circuit when being closed. The first sub-circuit and/or the second sub-circuit may constitute the first circuit. The output control device further includes a fifth capacitor 603 and a sixth capacitor 604. The fifth capacitor 603 is arranged in the first sub-circuit, and the sixth capacitor 604 is a capacitor shared by the second sub-circuit and the second circuit.

Specially, as shown in FIG. 6, the first end of the inverter bridge circuit 504 is connected to the first end of the first capacitor 506, a first end of the first sub-switch 601 and a first end of the second sub-switch 602, respectively; the second end of the first capacitor 506 is connected to the first end of the first inductor 505; the second end of the first inductor 505 is connected to the first end of the second switch 503 and the first end of the third capacitor 508, respectively; the second end of the second switch 503 is connected to the first end of the second capacitor 507, and the second end of the second capacitor 507 is connected to the second end of the inverter bridge circuit 504 and the second end of the output component 501. Further, the second end of the third capacitor 508 is connected to a second end of the second sub-switch 602 and a first end of the sixth capacitor 604, respectively. In addition, a second end of the sixth capacitor 604 is connected to the first end of the output component 501 and a second end of the fifth capacitor 603, respectively. A second end of the first sub-switch 601 is connected to a first end of the fifth capacitor 603.

In this way, in the circuit topology shown in FIG. 6, under the condition that the first sub-switch 601 is closed, the second sub-switch 602 is not closed and the second switch 503 is not closed, the fifth capacitor 603 is in an working state, and the alternating current output by the inverter circuit 504 acts on the output component 501 via the fifth capacitor 603, such that the first output wire coil in the output component heats the target object with a power in the first output power interval. Under the condition that the first sub-switch 601 is not closed, the second sub-switch 602 is closed and the second switch 503 is not closed, the sixth capacitor 604 is in an working state, and the alternating current output by the inverter circuit 504 acts on the output component 501 via the sixth capacitor 604, such that the first output wire coil in the output component heats the target object with a power in the second output power interval.

In addition, under the condition that both the first sub-switch 601 and the second sub-switch 602 are closed, and the second switch 503 is not closed, the alternating current output by the inverter circuit 504 is acted on the output component 501 via the fifth capacitor 603 and the sixth capacitor 604 in parallel, such that the first output wire coil in the output component heats the target object with a power in the third output power interval. Under the condition that neither the first sub-switch 601 nor the second sub-switch 602 is closed and the second switch 503 is closed, the alternating current output by the inverter circuit 504 acts on the output component 501 via the first capacitor 506, the first inductor 505, the second capacitor 507, the third capacitor 508 and the sixth capacitor 604, such that the first output wire coil in the output component enters the power transmission working state to transmit power to the target object.

In other embodiments, the output control device further includes a processor, which is configured to determine that the first output wire coil of the output component enters the heating working state or the power transmission working state based on a control instruction.

Here, the control instruction may be a working state switching instruction input by a user. Generally, the output control device can provide buttons with different functions on the outermost side, for example, power transmission mode button and heating mode button. The processor may determine based on the control instruction the working state that the output control device will enter.

Specifically, the output control device may further include a memory, and a controller switches the working state of the output component based on the software program stored in the memory. In particular, when it is determined that the first output wire coil of the output component enters the heating working state, the first switch is controlled to be closed and the second switch is controlled not to be closed; and when it is determined that the first output wire coil of the output component enters the power transmission working state, the second switch is controlled to be closed and the first switch is controlled not to be closed.

It should be noted that the same steps and contents in these embodiments as in other embodiments can be described with reference to other embodiments and will be not repeatedly described here.

The output control device provided in some embodiments of the present disclosure may include an output component, a first switch and a second switch. The output component includes a first output wire coil, and is configured to control the first output wire coil to enter a heating working state when a first circuit is turned on and a second circuit is not turned on, and to control the first output wire coil to enter a power transmission working state when the first circuit is not turned on and the second circuit is turned on. The first switch is located in the first circuit and is configured to turn on the first circuit when being closed. The second switch is located in the second circuit and is configured to turn on the second circuit when being closed. In this way, the heating function and the power transmission function are integrated in the same device via the output component, the first switch and the second switch, and the switching between the heating working state and the power transmission working state is realized through the closed or open state of the first switch and the second switch. As such, the utilization rate and intelligent degree of the device are improved, and the users' experience is enhanced.

Figure 7:
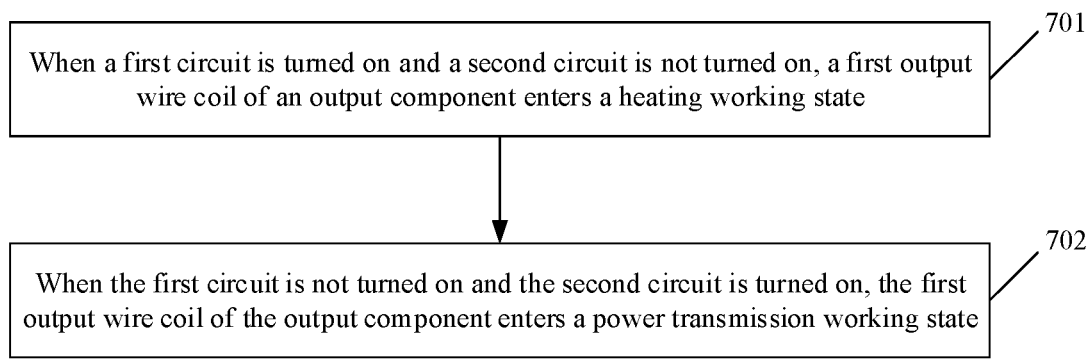
FIG. 7 is flow diagram of an output control method provided by some embodiments of the present disclosure.

Based on the above output control device, some embodiments of the present disclosure also provides an output control method, as shown in FIG. 7, the method includes the following steps.

At 701, when a first circuit is turned on and a second circuit is not turned on, a first output wire coil of an output component enters a heating working state.

At 702, when the first circuit is not turned on and the second circuit is turned on, the first output wire coil of the output component enters a power transmission working state.

The first circuit is provided with a first switch and is turned on when the first switch is closed, and the second circuit is provided with a second switch and is turned on when the second switch is closed.

Here, the steps 701 and 702 are executed by the processor in the output control device.

Specifically, the first switch 302 and the second switch 303 may be circuit switches having both closed and open states. When the first switch is closed and the second switch is opened, the first circuit is turned on and the second circuit is not turned on. At this time, the processor determines that the first circuit is connected to the output component, and controls the first output wire coil in the output component to be in the heating working state. When the first switch is opened and the second switch is closed, the first circuit is not turned on and the second circuit is turned on. At this time, the processor determines that the second circuit is connected to the output component, and controls the first output wire coil in the output component to be in the power transmission working state.

Further, the first output wire coil may be an operation wire reel constituted by at least one wire coil. Under the condition that the first circuit is turned on and the second circuit is not turned on, the operation wire reel may generate an alternating magnetic field with a constantly changing direction, and the conductor is warmed up through the Joule heating effect, thereby realizing the heating function. In addition, under the condition that the first circuit is not turned on and the second circuit is turned on, the above operation wire reel may generate an induced magnetic flux for power transmission.

Specifically, the operation that when the first circuit is turned on and the second circuit is not turned on, the output component enters the heating working state, includes the following operations.

When a first sub-circuit is turned on and a second sub-circuit is not turned on, the first output wire coil enters a first heating working state in which a first output power interval is adopted for heating.

When the second sub-circuit is turned on and the first sub-circuit is not turned on, the first output wire coil enters a second heating working state in which a second output power interval is adopted for heating.

When the first sub-circuit is turned on and the second sub-circuit is turned on, the first output wire coil enters a third heating working state in which a third output power interval is adopted for heating.

The first sub-circuit is provided with a first sub-switch and is turned on when the first sub-switch is closed.

The second sub-circuit is provided with a second sub-switch and is turned on when the second sub-switch is closed.

Specifically, the first sub-circuit is constituted by the first sub-switch and a first sub-capacitor, and the second sub-circuit is constituted by the second sub-switch and a second sub-capacitor. The capacitance of the first sub-capacitor and the capacitance of the second sub-capacitor are different. The powers of the first output power interval, the second output power interval and the third power interval are different. Exemplarily, the first output power interval may be 1 kW-3 kW; the second output power interval may be 100 W-1 kW; the third output power range may be 1.5 kW-3.3 kW.

In this way, under the condition that the first sub-circuit is turned on, the second sub-circuit is not turned on and the second circuit is not turned on (that is, the first sub-switch is closed, the second sub-switch is not closed and the second switch is not closed), the first sub-capacitor in the first sub-circuit is in an working state, the processor determines that the first sub-capacitor acts on the output component 301, and controls the first output wire coil in the output component to heat the target object with a power in the first output power interval.

In addition, under the condition that the first sub-circuit is not turned on, the second sub-circuit is turned on and the second circuit is not turned on (that is, the first sub-switch is not closed, the second sub-switch is closed and the second switch is not closed), the second sub-capacitor in the second sub-circuit is in an working state, the processor determines that the second sub-capacitor acts on the output component 301, and controls the first output wire coil in the output component to heat the target object with a power in the second output power interval.

Further, under the condition that both the first sub-circuit and the second sub-circuit are turned on, and the second circuit is not turned on (that is, both the first sub-switch and the second sub-switch are closed, and the second switch is not closed), the processor determines that the first sub-capacitor and the second sub-capacitor acts on the output component 301 in parallel, such that the first output wire coil in the output component heats the target object with a power in the third output power interval.

Finally, under the condition that neither the first sub-circuit nor the second sub-circuit is turned on, and the second circuit is turned on (that is, neither the first sub-switch nor the second sub-switch is closed, and the second switch is closed), the processor determines that the second circuit acts on the output component 301, such that the first output wire coil in the output component enters the power transmission working state to transmit power to the target objects.

In other embodiments of the present disclosure, the following operation is further included.

The processor determines that the first output wire coil of the output component enters the heating working state or the power transmission working state based on a control instruction.

It should be noted that the same steps and contents in these embodiments as in other embodiments can be described with reference to other embodiments and will be not repeatedly described here.

The output control method provided in some embodiments of the present disclosure may include an output component, a first switch and a second switch. The output component includes a first output wire coil, and is configured to control the first output wire coil to enter a heating working state when a first circuit is turned on and a second circuit is not turned on, and to control the first output wire coil to enter a power transmission working state when the first circuit is not turned on and the second circuit is turned on. The first switch is located in the first circuit and is configured to turn on the first circuit when being closed. The second switch is located in the second circuit and is configured to turn on the second circuit when being closed. In this way, the heating function and the power transmission function are integrated in the same device via the output component, the first switch and the second switch, and the switching between the heating working state and the power transmission working state is realized through the closed or open state of the first switch and the second switch. As such, the utilization rate and intelligent degree of the device are improved, and the users' experience is enhanced.

Some exemplary embodiments of the present disclosure also provide a computer readable storage medium, for example, a memory including a computer program executable by a processor of an output control device to implement the steps of the aforementioned method. The computer readable storage medium may be ferromagnetic random access memory (FRAM), read only memory (ROM), programmable read-only memory (PROM), erasable programmable read-only memory (EPROM), electrically erasable programmable read-only memory (EEPROM), flash memory, magnetic surface memory, compact disc, or compact disc read-only memory (CD-ROM).

Those skilled in the art should understand that embodiments of the present disclosure may be provided as methods, systems or computer program products. Therefore, the present disclosure may take the form of hardware embodiments, software embodiments or embodiments combining software and hardware aspects. Further, the present disclosure may take the form of a computer program product implemented on one or more computer-usable storage media (including, but not limited to, disk storage, optical storage, etc.) containing computer-usable program code therein.

The present disclosure is described with reference to flow diagrams and/or block diagrams of methods, devices (systems), and computer program products according to embodiments of the present disclosure. It should be understood that each flow and/or block in the flow diagrams and/or block diagrams, as well as combinations of the flow and/or block in the flow diagrams and/or block diagrams, may be implemented by computer program instructions. These computer program instructions may be provided to a processor of a general purpose computer, a special purpose computer, an embedded processor, or other programmable data processing device to generate a machine, such that instructions executed by a processor of a computer or other programmable data processing device generate a device for implementing the functions specified in one or more flows of the flow diagrams and/or one or more blocks of the block diagrams.

These computer program instructions may also be stored in a computer readable memory that directs a computer or other programmable data processing device to operate in a specific manner, such that the instructions stored in the computer readable memory generate an article of manufacture including instruction device. The instruction device implements the functions specified in one or more flows of the flow diagrams and/or one or more blocks of the block diagrams.

These computer program instructions may also be loaded onto a computer or other programmable data processing device, such that a series of operational steps are executed on the computer or other programmable device to produce computer-implemented processes, such that instructions executed on the computer or other programmable device provide steps for implementing the functions specified in one or more flows of the flow diagrams and/or one or more blocks of the block diagrams.

The above description is only preferred embodiments of the present disclosure and is not intended to limit the scope of protection of the present disclosure.

The invention claimed is:

1. An output control device, comprising:
an output component;
a first circuit;
a second circuit;
an inductor arranged in the second circuit;
a first switch, and
a second switch, wherein:
the output component comprises a first output wire coil, and the output control device is configured to control the first output wire coil to enter a heating working state when the first circuit is turned on and the second circuit is not turned on and to control the first output wire coil to enter a power transmission working state when the first circuit is not turned on and the second circuit is turned on;
the first switch is located in the first circuit and is configured to turn on the first circuit when being closed; and
the second switch is located in the second circuit and is configured to turn on the second circuit when being closed.

2. The device according to claim 1, wherein the first switch comprises a first sub-switch and a second sub-switch, wherein:
the first sub-switch is located in a first sub-circuit and is configured to turn on the first sub-circuit when being closed; and
the second sub-switch is located in a second sub-circuit and is configured to turn on the second sub-circuit when being closed,
wherein the first sub-circuit and/or the second sub-circuit constitute the first circuit.

3. The device according to claim 2, wherein the output component is configured to:
when the first sub-circuit is turned on and the second sub-circuit is not turned on, the first output wire coil is controlled to enter a first heating working state in which a first output power interval is adopted for heating.

4. The device according to claim 3, wherein the device is configured to switch from the first heating working state into a second heating working state in which a second output power interval is adopted for heating when the second sub-circuit is turned on and the first sub-circuit is not turned on, and wherein the first heating working state is different from the second heating working state.

5. The device according to claim 1, further comprising:
a processor, configured to determine that the first output wire coil of the output component enters the heating working state or the power transmission working state based on a control instruction.

6. The device according to claim 5, wherein:
the processor is configured to control the first switch to be closed and the second switch not to be closed when it is determined that the first output wire coil of the output component enters the heating working state; and
the processor is configured to control the second switch to be closed and the first switch not to be closed when it is determined that the first output wire coil of the output component enters the power transmission working state.

7. The device according to claim 1, further comprising a first capacitor connected in series to the inductor.

8. The device according to claim 7, wherein the first switch is configured so that a current bypasses the inductor and the first capacitor when the first switch is closed.

9. An output control method, comprising:
controlling a first output wire coil of an output component to enter a heating working state when a first circuit is turned on and a second circuit is not turned on, wherein an inductor and a capacitance are arranged in the second circuit; and
controlling the first output wire coil of the output component to enter a power transmission working state when the first circuit is not turned on and the second circuit is turned on;
wherein the first circuit is provided with a first switch and is turned on when the first switch is closed, and while the first switch is closed, a current bypasses the inductor and a capacitor in the second circuit, and the second circuit is provided with a second switch and is turned on when the second switch is closed.

10. The method according to claim 9, wherein controlling a first output wire coil of an output component to enter a heating working state when a first circuit is turned on and a second circuit is not turned on comprises the following operations:

when a first sub-circuit is turned on and a second sub-circuit is not turned on, the first output wire coil enters a first heating working state in which a first output power interval is adopted for heating;

when a second sub-circuit is turned on and a first sub-circuit is not turned on, the first output wire coil enters a second heating working state in which a second output power interval is adopted for heating; and when a first sub-circuit is turned on and a second sub-circuit is turned on, the first output wire coil enters a third heating working state in which a third output power interval is adopted for heating;

wherein, the first sub-circuit is provided with a first sub-switch and is turned on when the first sub-switch is closed; and the second sub-circuit is provided with a second sub-switch and is turned on when the second sub-switch is closed.

11. The method according to claim 9, further comprising:

determining that the first output wire coil of the output component enters the heating working state or the power transmission working state based on a control instruction.

12. A non-transitory computer-readable storage medium, wherein the non-transitory computer-readable storage medium stores one or more programs executable by one or more processors to implement the steps of the output control method according to claim 9.

\* \* \* \* \*